June 28, 1932.  J. F. CRAIG  1,865,085
FOOT CONTROLLED BRAKE EQUIPMENT
Filed Sept. 3, 1930
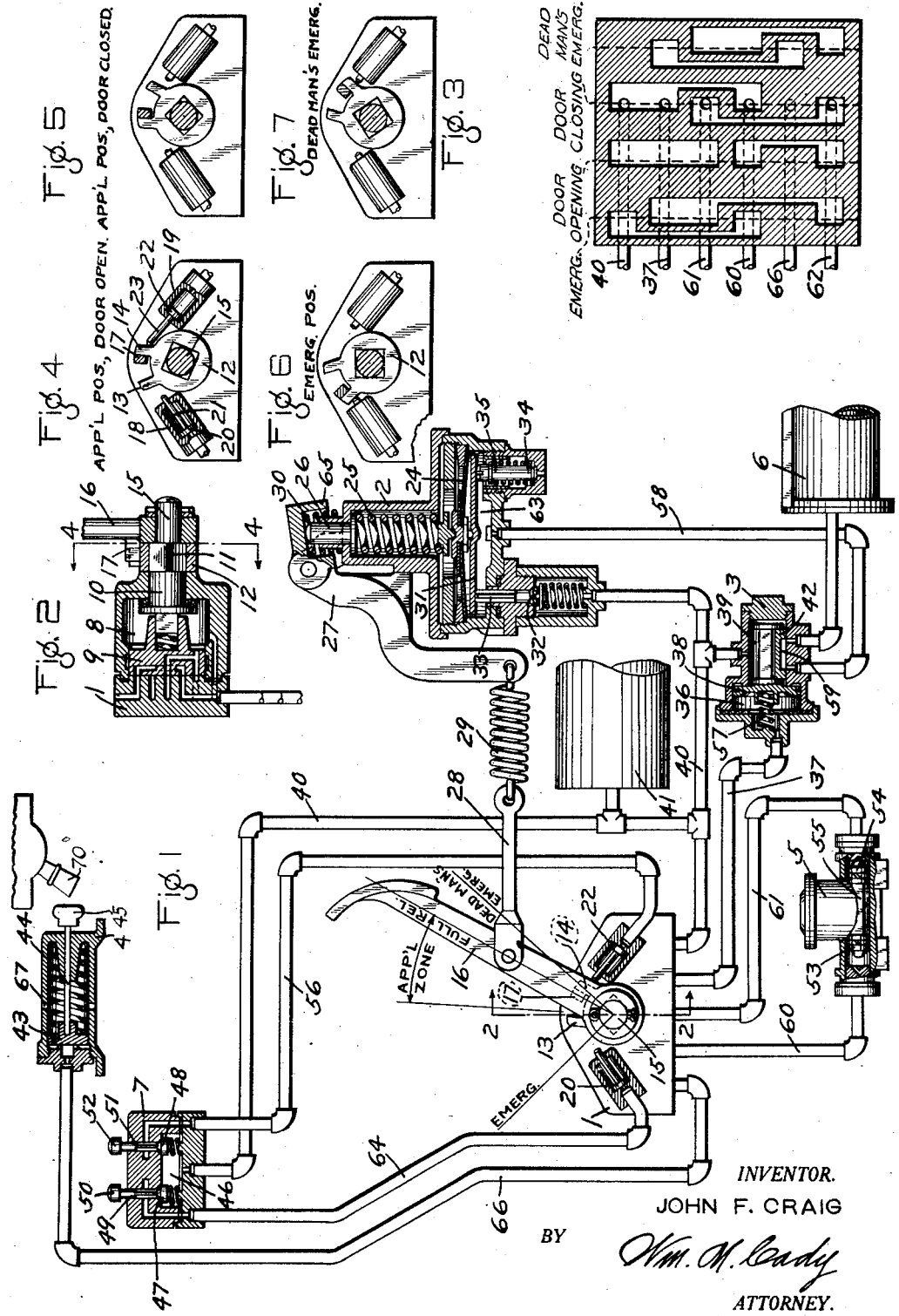
INVENTOR.
JOHN F. CRAIG
BY Wm. M. Cady
ATTORNEY.

Patented June 28, 1932

1,865,085

UNITED STATES PATENT OFFICE

JOHN F. CRAIG, OF UPPER MONTCLAIR, NEW JERSEY, ASSIGNOR TO THE WESTINGHOUSE AIR BRAKE COMPANY, OF WILMERDING, PENNSYLVANIA, A CORPORATION OF PENNSYLVANIA

FOOT CONTROLLED BRAKE EQUIPMENT

Application filed September 3, 1930. Serial No. 479,448.

This invention relates to safety car control equipments, and has for its principal object to provide a generally improved and simplified equipment in which the control of the brakes is interlocked with the control of the car doors.

Another object of the invention is to provide an improved car door interlock control, such that the operator cannot open the car doors unless the brakes are applied and cannot release the brakes unless the car doors are closed.

Other objects and advantages will appear in the following more detailed description of the invention.

In the accompanying drawing: Fig. 1 is a diagrammatic view of a car safety control equipment embodying my invention; Fig. 2 a section on the line 2—2 of Fig. 1; Fig. 3 a developed diagarm, showing the various operating positions of the rotary valve employed in the Fig. 1 equipment; Fig. 4 a section on the line 4—4 of Fig. 2 showing the relative positions of the parts, when the push button is operated to open the car doors; and Figs. 5 to 7, on the same section line as Fig. 4, showing the respective positions of brake application, doors open, brake application, doors closed, emergency brake application, and dead man's emergency application position.

As shown in Fig. 1, the equipment may comprise a pedal controlled brake and door controlling device 1, a self lapping brake valve device 2, an emergency valve device 3, a circuit breaker cylinder 4, a door engine 5, a brake cylinder 6, and a push button door control device 7.

The controlling device 1 may comprise a casing having a valve chamber 8 containing a rotary valve 9 having an operating stem 10. Fitted on a squared section 11 of the stem is a sleeve 12 having radial lugs 13 and 14. Mounted to rotate on a cylindrical extension 15 of the stem 10 is a pedal lever 16, having a lug 17, which extends into the space intermediate the lugs 13 and 14.

Associated with the device 1 are cylinders 18 and 19, the cylinder 18 containing a piston 20 having a stem 21 adapted to engage and shift the lug 13, when the piston 20 is projected, and the cylinder 19 containing a piston 22 having a stem 23 adapted to engage and shift the lug 14 when the piston 22 is projected.

The brake valve device 2 may be of a well known construction comprising a casing containing a flexible diaphragm 24 adapted to be subjected to the pressure of a coil spring 25. A spring engaging stem 26 projects out of the casing and is adapted to be engaged by one arm of a pivoted lever 27, the other arm of which is operatively connected to the pedal lever 16, through a link 28 and a coil spring 29. A spring 30 acts on the lever 27 and urges said lever away from the stem 26.

The diaphragm 24 is adapted to operate a follower member 31, which is operatively associated with a fluid pressure supply valve 32 having a stem 33 engaging said member, and with a release valve 34 having a stem 35 in engagement with said member.

The emergency valve device 3 may comprise a casing having a piston chamber 36 connected to an emergency brake pipe 37 and containing a piston 38, and having a valve chamber 39 connected through pipe 40 with a main reservoir 41, or other source of fluid under pressure, and containing a slide valve 42, adapted to be operated by piston 38.

The circuit breaker cylinder 4 contains a piston 43 having a stem 44 which projects out of the cylinder and carries at its outer end a knob 45 adapted to engage a circuit breaker handle (not shown), the operation of which is adapted to open the power circuit of the car.

The push button device 7 may comprise a casing having a valve chamber 46 connected to main reservoir pipe 40 and containing valves 47 and 48. The valve 47 has a stem 49 carrying a push button 50 and valve 48 has a stem 51 carrying a push button 52.

The door engine 5 may be of the well known construction, comprising a casing containing pistons 53 and 54 connected by a stem 55 and adapted when the pistons are moved to the left to effect the opening of the car doors and when moved to the right to effect the closing of the car doors.

The spring 30 tends to rotate the lever 27 in a clockwise direction, and consequently the lever 27, being connected to the pedal lever 16 through the spring 29 and the link 28, tends to shift the lever 16 to the right or to the dead man's emergency position. Therefore, in order to maintain the brakes released, the operator must depress the pedal lever 16, so as to move the lever 16 from the dead man's emergency position to the full release position shown in Fig. 1. By this movement, the spring 30 is compressed and the cap portion of the lever 27 is brought into engagement with the stem 26.

The rotary valve 9 is in the dead man's emergency position initially, due to the lug 17 on the pedal lever 16 having acted on the lug 14 of the sleeve 12, so that after the pedal lever 16 has been moved by the operator to release position, it is necessary to shift the rotary valve to the door closing position. To accomplish this, the push button 52 is operated to unseat the valve 48, so that fluid under pressure is supplied to piston 22, through pipe 56.

Piston 22 then projects stem 23 into engagement with the lug 14 and the sleeve 12, with the rotary valve 9 are turned until the lug 14 engages the lug 17 on the pedal lever 16. The lug 17 prevents further movement of the sleeve 12 and the rotary valve to the door open position, so that the rotary valve remains in the door closing position, which is defined by the pedal lever 16 in its release position.

In the door closing position, as shown in Fig. 3, the rotary valve ports are such that the emergency brake pipe 37 is connected to the main reservoir pipe 40. Fluid at main reservoir pressure is then present in piston chamber 36 and in valve chamber 39 of the emergency vlave device 3, permitting the spring 57 to shift the piston 38 and slide valve 42 to release position, as shown in Fig. 1. In this position, the straight air pipe 58 is connected to the brake cylinder 6 through cavity 59 in slide valve 42.

The door closing pipe 60 is connected through the rotary valve 9 in the door closing position with the main reservoir pipe 40, so that fluid under pressure is supplied to the piston 53 of the door engine 5. The door openings pipe 61 is connected in this position with atmospheric exhaust pipe 62, so that piston 54 of the door engine is at atmospheric pressure, and the door engine operating pistons are maintained in the door closing position, as shown in Fig. 1.

To effect a straight air application of the brakes, the pedal lever 16 is further depressed from the release position in the direction of the application zone. The lever 27 is then operated to depress the member 26 and compress the spring 25, it being understood that the spring 29 is of greater resistance than the spring 25, so as to permit of compressing the spring 25, without substantially stretching the spring 29.

The pressure applied to spring 25 is transmitted to diaphragm 24, which is then depressed, so that the release valve 34 is seated, and the supply valve 32 is unseated. Fluid under pressure is then supplied from the main reservoir pipe 40 to chamber 63 and thence through pipe 58 and cavity 59 to the brake cylinder 6. When the perssure of fluid supplied to chamber 63 and the brake cylinder slightly exceeds the opposing pressure of spring 25, the diaphragm 24 is deflected upwardly so as to permit the valve 32 to seat and cut off the further supply of fluid to the brake cylinder.

When the pedal lever 16 is in release position, the car doors cannot be opened, since the engagement of lug 14 with lug 17 on the pedal lever prevents the movement of the sleeve 12 and the rotary valve to the door opening position by operation of piston 22 and stem 23. When, however, the pedal lever 16 is in the brake application zone, so that the brakes are applied, the car doors may be opened by pressing the button 52, so that the valve 48 is unseated to supply fluid under pressure to the piston 22. The piston 22 is then operated to project the stem 23, so that the lug 14 is operated to rotate the sleeve 12 and the rotary valve 9 to the door opening position.

The car doors are also closed after being opened when the brakes are applied, upon movement of the pedal lever 16 from application position to the full release position, since the lug 17 on the pedal lever 16 will engage the lug 14 on the sleeve 12 and thus effect the rotation of the sleeve and the rotary valve 9 to the door closing position.

In this position, as shown in Fig. 3, the door opening pipe 61 is connected to the main reservoir, while the door closing pipe 60 is connected to the atmosphere. The pistons of the door engine 5 are then shifted to the left from the door closing position, to the door opening position.

The doors may be closed when desired by the operator, by depressing the button 50, so that the valve 47 is unseated, permitting the supply of fluid under pressure through pipe 64 to piston 20. The stem 21 is then projected by piston 20, so that the lug 13 is operated to rotate the sleeve 12 and the rotary valve 9 to the door closing position.

If it is desired to effect an emergency application of the brakes, the operator depresses the pedal lever 16 beyond the service application zone to the emergency position. In so doing, the lug 17 engages the lug 13 and the sleeve 12 and the valve 9 are then rotated to the emergency position, in which, as shown in Fig. 3, ports in the rotary valve 9 connect the emergency brake pipe 37 with the atmosphere. The pressure in the piston chamber 36 of the emergency valve device 3 is thus suddenly reduced, so that piston 38 is shifted to emergency position, in which the brake cylinder 6 is connected to valve chamber 39 and the main reservoir to effect an emergency application of the brakes.

In the emergency position of the rotary valve 9, the door closing pipe 60 is connected to the main reservoir, while the door opening pipe 61 is connected to the atmosphere, so that the door engine remains in the door closing position.

In moving the pedal lever 16 to emergency position, after the projection 65 on the lever 27 engages the casing 2, further movement of the pedal lever 16 is permitted by the stretching of the spring 29.

If the operator should become incapacitated, or otherwise release the pedal lever 16, said lever will be thrown to the dead man's emergency position by the action of the spring 30.

The rotary valve 9 is then shifted to the dead man's emergency position, as shown in Fig. 3, in which the emergency brake pipe 37 is connected, through a cavity in the rotary valve, with pipe 66, leading to the circuit breaker cylinder 4. Fluid supplied from the emergency brake pipe to the circuit breaker cylinder, operates to project the piston 43 and the stem 44, so that the knob 45 operates the handle of the circuit breaker (not shown) to thereby effect the opening of the power circuit of the car.

When the piston 43 moves out beyond the atmospheric port 67 in the cylinder 4, fluid under pressure is vented from pipe 66 and from the emergency brake pipe 37, so as to cause the operation of the emergency valve device 3 to effect an emergency application of the brakes.

In the dead man's emergency position, the door opening pipe 61 and the door closing pipe 60 are connected through a cavity in the rotary valve 9 with atmospheric exhaust pipe 62, so that atmospheric pressure exists on both of the pistons 53 and 54 of the door engine 5. The fluid pressures on the pistons of the door engine being thus balanced, the car doors may be opened at will by a passenger or other person.

The lug 17 can move freely between the lugs 13 and 14 in the movement of the pedal lever 16 through the brake application zone, so that the operator's foot is relieved of the frictional resistance to movement, due to the rotation of the rotary valve 9. It will now be seen that the doors cannot be opened with the pedal lever 16 in release position, since lug 17 prevents movement of the lug 14. When the pedal lever is in the brake application zone, however, the lug 14 may be shifted by operation of piston 22 so as to move the rotary valve 9 to its door open position.

The rotary valve 9 also acts as an emergency control valve, so that when the pedal lever 16 is moved to emergency position, the rotary valve 9 will be operated by lug 13 to effect a reduction in pressure on the emergency valve device 3.

The car doors may be closed when desired by depressing the button 50, so that piston 20 is operated to actuate the lug 13 and thus turn the rotary valve 9 to the door closing position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake and door controlling device, the combination with a pedal lever and means operated by said lever for controlling the brakes, of a valve for controlling the fluid pressure for effecting the operation of a door, a member for operating said valve, a lug carried by said member, and a lug carried by said lever and adapted to engage said member lug to operate said valve upon movement of said lever.

2. In a brake and door controlling device, the combination with a pedal lever and means operated by said lever for controlling the brakes, of a valve for controlling the fluid pressure for effecting the operation of a door, a member for operating said valve, a lug carried by said member, a lug carried by said lever and adapted to engage said member lug to operate said valve upon movement of said lever in one direction, and another lug carried by said member and adapted to be engaged by said lever lug upon movement of said lever in the opposite direction, to also operate said valve.

3. In a brake and door controlling device, the combination with a pedal lever and means operated by said lever for controlling the brakes, of a door controlling valve, a member for operating said valve, a lug carried by said member, a lug carried by said lever and adapted to engage said member lug, fluid pressure operated means for also operating said member lug, and manually operated means for varying the fluid pressure on said fluid pressure operated means.

4. In a brake and door controlling device, the combination with a pedal lever and means operated by said lever for controlling the brakes, of a door controlling valve, a member for operating said valve, spaced lugs carried by said member, and a lug carried by said lever and movable intermediate said spaced lugs to permit operation of said lever to control the brakes without engaging said spaced lugs.

5. In a brake and door controlling device,